Dec. 4, 1956  G. L. NAUS  2,772,724
ADJUSTABLE REST FOR LOCOMOTIVE SEAT
Filed Nov. 3, 1952  2 Sheets-Sheet 1

*INVENTOR.*
GLEN L. NAUS
BY
*Glen J. Hyde*
ATTORNEY

Dec. 4, 1956     G. L. NAUS     2,772,724
ADJUSTABLE REST FOR LOCOMOTIVE SEAT
Filed Nov. 3, 1952     2 Sheets-Sheet 2

INVENTOR.
GLEN L. NAUS
BY
Eber J. Hyde
ATTORNEY

United States Patent Office 2,772,724
Patented Dec. 4, 1956

2,772,724

ADJUSTABLE REST FOR LOCOMOTIVE SEAT

Glen L. Naus, Willard, Ohio

Application November 3, 1952, Serial No. 318,480

1 Claim. (Cl. 155—160)

This invention pertains to an adjustable arm, side and back rest for seats and, more particularly, it pertains to a rest useful in the cab of a diesel-type switching locomotive.

The present diesel-switching locomotives have a seat for the engineer which has no back rest, side rest, nor arm rest. The engineer sits facing the center of the cab and he looks over his right shoulder through a window toward the front of the engine. He also may look over his left shoulder to see the rear end of the engine and the cars behind it.

The operation of a switch engine, of necessity, entails repeated jerking due to bumping of the cars. The jolting, by accident, is sometimes severe enough to throw the engineer off of his seat. While this is somewhat unusual, there is continuous jolting of the engineer's body as he couples on to strings of cars. This jolting is most uncomfortable and produces in many engineers a general body fatigue which is uncomfortable and which at times reaches a dangerous level. I have found that the provision of a sturdy, comfortable, adjustable arm, side and back rest, particularly for the engineer's left arm by which he controls the brake valve and the sander, greatly reduces the effect of the jolting, thereby at the end of a day's work greatly reducing the fatigue.

There are a number of conditions peculiar to the cab of a switch locomotive which must be considered when designing a support for the engineer. The space between the seat and the controls in front of the seat is very limited. Accordingly, the rest (which preferably is connected to the left side of the seat as the engineer faces the center of the cab in his normal operating position) must be designed to permit the engineer to get in and out of his seat. Also, in case of emergency, the engineer must be able to get past the rest in a hurry. Further, the jolting throws a severe longitudinal strain on the rest as the engineer's body is thrown against it. There is also considerable strain on the device as the engineer's body is thrown away from the rest and the engineer clamps it with his elbow in order to prevent being thrown away from the arm rest. Another condition is that the engineer controls the brake valve and the sander with his left hand and accordingly it is important that the arm rest portion of the device position the engineer's arm for the most comfortable and easy operation of these two controls. To this end it is desirable that the rest be adjustable in the vertical direction in order that engineers of different sizes may use the same device.

It is an object of the invention to provide an adjustable arm rest and body support device for a seat in a switching-type diesel locomotive.

Another object of the invention is to provide an adjustable arm rest and body support device which permits the most comfortable operation of the brake valve and sander controls on a diesel-type switching locomotive.

A further object of the invention is to provide an arm rest and body support for a locomotive which can quickly and easily be removed from the path an engineer must take when he is moving quickly away from his seat.

A further object of the present invention is to provide an adjustable arm rest and body support device for use in a locomotive which is sufficiently rugged to long withstand repeated longitudinal thrusts against it from all directions.

For a better understanding of the present invention, together with other and further objects thereof, reference is had to the following description taken in connection with the accompanying drawings, and its scope will be pointed out in the appended claims.

One aspect of the present invention comprises an adjustable arm rest and body support device for a seat, particularly for a seat in a locomotive, which includes an upwardly extending support which is either permanently connected to the engineer's seat or which may be replaceably connected to the seat. The padded portion of the device against which the engineer rests has a rigid back member including slide means which are in slidable engagement with the support so that the padded portion can be moved up and down with respect to the fixed support, thereby to adjust the vertical height of the padded portion with respect to the seat. Locking means are connected to the back member and are in engagement with the support for locking the back member to the support at any one of a number of fixed positions. The support includes a fixed member which is either permanently connected to the seat or is adapted to be securely connected thereto, and it includes a movable member connected to the fixed member by angularly adjustable means so that the angular position of the movable member can be altered with respect to the seat. The adjustable portion of the device also includes manually controlled locking means connected to the support for locking the support to the fixed member at any one of a plurality of fixed angular positions.

With reference to the drawings, Fig. 1 is a back view of the entire device comprising the support and the padded or rest portion;

Figure 1:
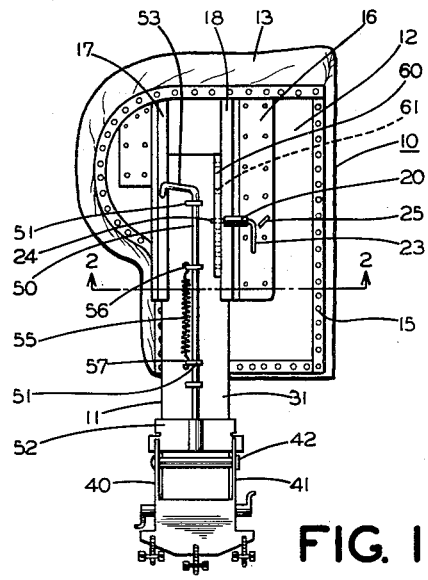

With reference to the drawing, there is shown an adjustable arm rest and body support device for a seat in a locomotive. The device is particularly designed for use in a diesel-type locomotive, and is of maximum usefulness in switching locomotives which make numerous starts and stops, and which continuously bump into strings of cars. The description to follow will often refer to this particular type of locomotive. It is to be understood, however, that this arm rest and body support device may be applied to any other type of locomotive which may need it and it is to be understood that some of the features of this invention are adaptable generally to supports and are not limited to use in any particular type of locomotive.

The arm rest and body support device comprises two main portions. One portion is the padded rest portion 10 and the other portion is an upwardly extending support 11 which is either permanently connected to the frame of the seat or is provided with means whereby it may be temporarily secured to the frame of the seat. The support shown and described in this patent is of the latter type. The invention, however, is not to be construed as limited to the replaceable type of support.

The padded rest portion 10 has a rigid back member 12 to which is secured the leather cover 13. Positioned between the back member 12 and the cover 13 is the padding 14. The leather cover 13 is secured to the back member 12 by upholstery nails 15 in a manner well known to the art. A heavy metal plate 16 is bolted or otherwise affixed to the rigid back 12. This metal plate has connected to it two spaced-apart slide means 17 and 18. Each of these slide means may have a portion which extends a short distance away from the metal plate 16 and a turned portion which extends substantially parallel to, but spaced away from the metal plate 16 to form two channels which face each other. The support 11 is positioned in these two channels for sliding motion of the rest portion with respect to these two channels to facilitate sliding motion of the rest portion 10 with respect to the support.

The rest portion 10 also has connected to it locking means indicated generally by the reference character 20. The locking means comprises a tubular member 21 preferably welded to the metal plate 16. Within the tubular member 21 there is mounted an L-shaped slide bolt 22 having two legs 23, 24. The leg 24 of the L-shaped slide bolt is positioned within the tube 21 and the other leg 23 extends at a 90 degree angle to the first leg. A stop 25 is connected to the metal plate 16 at a location spaced from the end of the tube 21 and near the leg 23. The L-shaped slide bolt is adapted to slide transversely within the tube 21, the stop 25 limiting its movement away from the tube and the leg 23 engaging the tube to limit its movement in the other direction.

Figure 3:
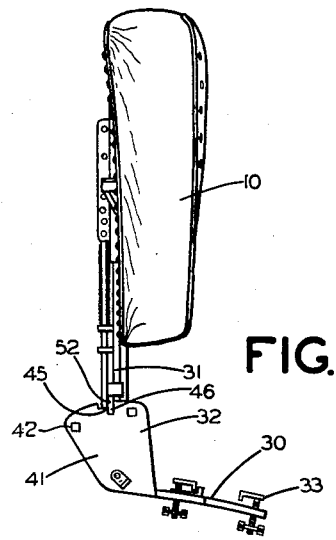
Fig. 3 is a side view of the entire device.
Figure 2:
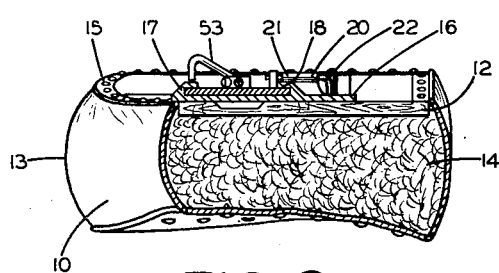
Fig. 2 is a sectional view taken along line 2—2 of Fig. 1.
Figure 5:
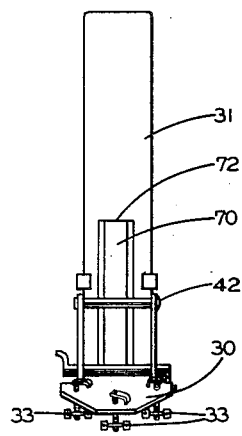
Fig. 5 is a front view of the support portion.
Figure 6:
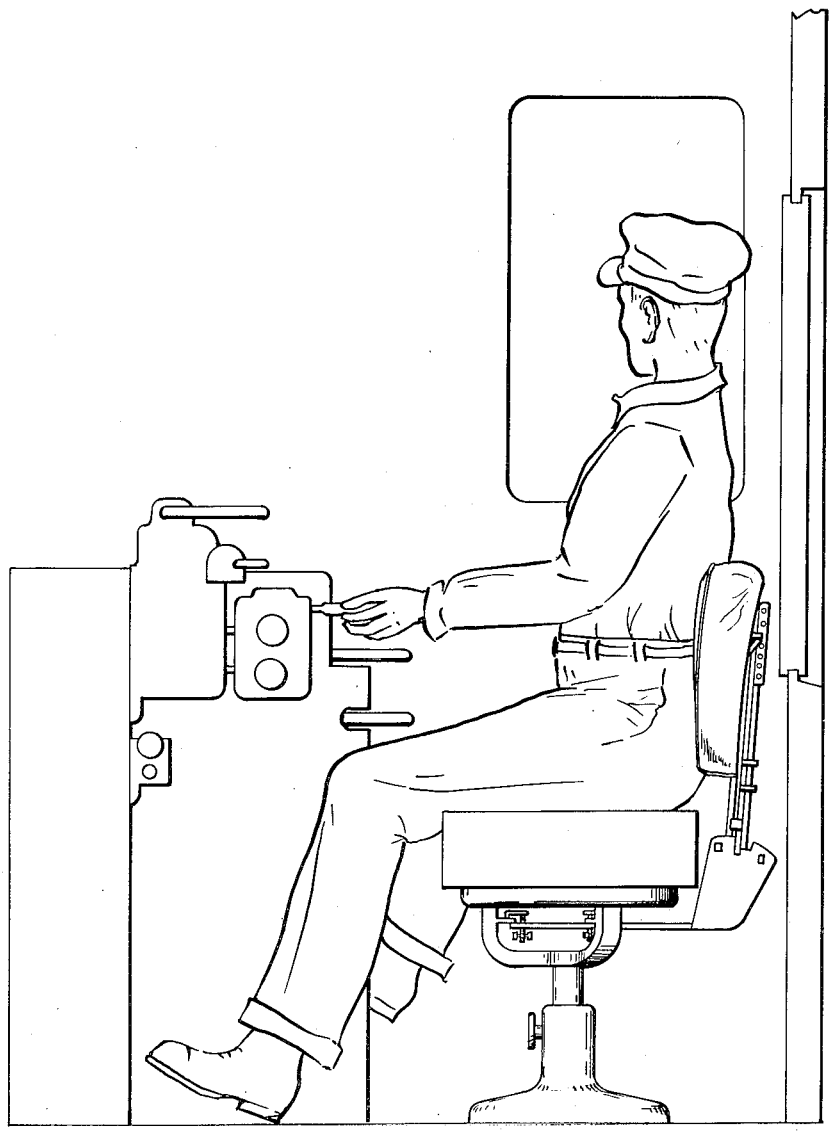
Figure 6 is a view showing the back rest connected to a locomotive seat.

The support 11, shown in detail in Fig. 5, is comprised of two main portions, the bottom generally horizontally extending portion 30 and the angularly adjustable upwardly extending metal plate 31. These two portions are connected together by means 32 shown in Fig. 3. The fixed member 30 includes a plurality of threaded clamping devices 33 for securing the support 11 to the frame of the seat on which the engineer sits. The fixed member has two upwardly extending spaced-apart sides 40, 41. The plate 31 extends down between the spaced plates 40, 41 and is connected to the rotatable bolt 42 extending between the two side plates 40, 41. The bolt 42 may pivot with respect to the side plates, thereby permitting the support 31 to pivot with respect to the fixed member 30. Each of the side plates 40, 41 is notched at two or more places 45, 46 in its upper surface. The upstanding support 31 has connected to it a manually controlled locking device comprising a rod 50 which is held to the plate 31 by means of a plurality of eyelets 51 welded to the plate 31. The rod 50 extends through these eyelets and carries a positioning blade 52 at its lower end. The blade 52 may be positioned in either of the notches 45, 46 in the upper edge of the side plates 40, 41. As shown in Fig. 3, it is locked in position in notch 46. The upper end of the rod 50 includes a handle 53 which extends outwardly away from the plate 31 and which extends at an angle to the main part of the control rod 50. One end 56 of a heavy tension spring 55 is connected to the rod 50 and the other end 57 is connected to one of the eyelets 51 which is welded to the plate 31. The spring 55 biases the rod 50 and the angular adjusting plate 52 down toward the angularly adjustable means 41, 42 to hold the plate 52 in the selected notch 45, 46. By moving the angular adjusting plate 52 from one of the notches 45, 46 to the other, the tilt of the entire rest device with respect to the engineer's seat may be changed. Any number of notches similar to notches 45, 46 may of course be provided.

When the rest portion 10 is connected to the upwardly extending support as shown in Fig. 1, the metal plate 31 is slidably positioned flat against the metal plate 16 and is held at its two edges by the two metal slides 17, 18. The rest portion 10 may be moved up and down with respect to the support 31 over a considerable distance, thereby adjusting the height of the top of the rest with respect to the seat.

Figure 4:
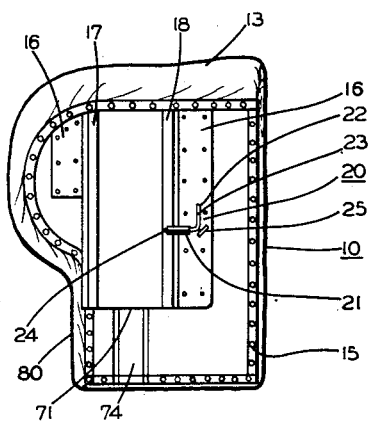
Fig. 4 is a back view of the padded or rest portion removed from its fixed support.

As the engineer places his left arm across the top of the rest 10, this serves to adjust the height of the arm rest for the engineer's left arm. The locking means 20 is adapted to secure the arm rest 10 at any one of a plurality of fixed, definite heights. The vertical plate 31 includes an outwardly extending raised metal plate 60 which has through it a plurality of holes 61 into which the leg 24 of the slide bolt 22 may be positioned, slide bolt 22 being rigidly secured to the rest portion 10 and the metal plate 60 being rigidly connected to the support 31. When the leg 24 of the slide bolt extends through a hole 61 in the metal plate 60, it will maintain the rest portion 10 and the support portion 31 in a fixed relative position. When the occupant of the seat wishes to adjust the height of the arm rest with respect to the seat, he merely lifts the leg 23 from its locked position shown in Fig. 1 into the position shown in Fig. 4. The leg 24 can then be withdrawn from the hole in the plate 60. The rest portion 10 can then be moved up or down with respect to the support portion 31 until a more suitable hole is opposite the leg 24. The slide bolt is then pushed into the hole and the leg 23 is turned to the locked position shown in Fig. 1 thereby positively locking the slide bolt in a position from which it cannot be accidentally removed as the stop 25 will keep the slide bolt from jiggling sufficiently far out of its position that the end of the leg 24 is removed from the positioning hole 61.

When the occupant of the seat wishes to change the angular position of the rest device, he pulls up on the handle 53 against the bias of the spring 55 thereby pulling the plate 52 out of one of the notches 45, 46. The rest portion 10, together with its support 31, can then be moved angularly with respect to the fixed member 30 until it is in a more suitable angular position, at which time the handle 53 is released and the plate 52 will snap into another notch in the side plates 40, 41. An extreme angular position may be obtained by withdrawing the plate 52 up out of the notches 45, 46 and then tilting the support 31 until the support plate 31 rests against the cross-bolt 42. This causes the entire device above the portion 30 which is secured to the frame of the seat to lean away from the engineer, opening up a wide clearance between the rest device and the controls, to permit the engineer to quickly move out between the seat and the controls. In an emergency this action of the device is of extreme importance. To facilitate the engineer's exit and to provide space for the engineer's leg during normal use, the corner 80 of the rest is indented.

In order that the rest device 10 will not fall too far down on the support 31, the support 31 is provided with a stop portion 70 which may comprise a plate of metal welded to the support 31. The lower edge 71 of the metal plate 16 is adapted to engage the upper end 72 of the stop 70, thereby to limit the downward motion of the rest portion 10 with respect to the support 31. A channel 74 may be provided in the back 12 of the arm rest 10 to accommodate the stop 70.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

An adjustable back rest device for a seat comprising: upwardly extending support means adapted to be secured to a seat; a back rest portion having a rigid back member; slide means connected to the back side of said back member and in slidable engagement with said support means whereby said back rest portion can slide up and down with respect to said support means to adjust the vertical height of said back rest portion with respect to said seat; locking means connected to said back member and in engagement with said support means for locking said back member to said support means at any one of a number of fixed positions, said locking means comprising a locking plate having a plurality of spaced apart holes mounted on said upwardly extending support, a tube secured to said back member with one open end facing the holes in said plate, an L-shaped slide bolt one leg of which is slidably and rotatably mounted within said tube, and a stop mounted on said back member at a location spaced from the end of said tube opposite said locking plate, the end of one leg of said slide bolt in its locking position being within one of the holes in said locking plate and the other leg extending downwardly between said stop and the end of said tube, said stop preventing the withdrawal of said slide bolt in this position, said other leg of said bolt being turned about said first leg within said tube clearing said stop to permit withdrawal of the end of said slide bolt from said hole in said locking plate; said support means including a fixed member adapted to be connected to said seat, a movable member, and angularly adjustable means connecting said movable member to said seat whereby the angular position of said movable member with respect to said seat can be altered; and manually controlled locking means connected to said support means for locking the movable member of said support means to said fixed member at any one of a plurality of fixed angular positions.

References Cited in the file of this patent

UNITED STATES PATENTS

| | | |
|---|---|---|
| 513,735 | Russell | Jan. 30, 1894 |
| 681,566 | McCloud | Aug. 27, 1901 |
| 788,899 | Grieves et al. | May 2, 1905 |
| 1,471,168 | Katz | Oct. 16, 1923 |
| 1,560,065 | Laraia | Nov. 3, 1925 |
| 1,632,737 | Lane | June 14, 1927 |
| 1,719,929 | Ferris | July 9, 1929 |
| 1,842,208 | Schneider | Jan. 19, 1932 |
| 1,846,548 | Ganoung et al. | Feb. 23, 1932 |
| 2,054,557 | Cramer | Sept. 15, 1936 |
| 2,427,234 | Shepherd | Sept. 9, 1947 |
| 2,567,626 | Trouslot | Sept. 11, 1951 |
| 2,592,702 | Sprung | Apr. 15, 1952 |